United States Patent [19]

Lee

[11] Patent Number: 4,523,982

[45] Date of Patent: *Jun. 18, 1985

[54] ELECTRON RICH AROMATICS AS CURE PROMOTERS FOR RADIATION CURABLE COMPOSITIONS

[75] Inventor: George A. Lee, Wayland, Mass.

[73] Assignee: The Dow Chemical Company, Midland, Mich.

[*] Notice: The portion of the term of this patent subsequent to Jun. 24, 1997 has been disclaimed.

[21] Appl. No.: 479,107

[22] Filed: Mar. 28, 1983

Related U.S. Application Data

[63] Continuation of Ser. No. 240,706, Mar. 5, 1981, abandoned.

[51] Int. Cl.$^3$ .............................................. C08F 2/50
[52] U.S. Cl. ........................ 204/159.15; 204/159.19; 204/159.23
[58] Field of Search ................ 204/159.23, 159.15, 204/159.19

[56] References Cited

U.S. PATENT DOCUMENTS

| | | | |
|---|---|---|---|
| 3,715,293 | 2/1973 | Sandner et al. | 204/159.23 |
| 4,069,054 | 1/1978 | Smith | 96/115 P |
| 4,077,858 | 3/1978 | Costanza et al. | 204/159.23 |
| 4,209,371 | 6/1980 | Lee | 204/159.22 |
| 4,408,023 | 10/1983 | Gould et al. | 525/454 |

OTHER PUBLICATIONS

Kosar, "Light Sensitive Systems", 1965, Wiley, pp. 142-146.

*Primary Examiner*—John C. Bleutge
*Assistant Examiner*—A. H. Koeckert
*Attorney, Agent, or Firm*—Paul D. Hayhurst

[57] ABSTRACT

Photocurable compositions containing a polyethylenically unsaturated resin compound and a monoethylenically unsaturated diluent are cured to form compositions containing essentially no polymerizable ethylenically unsaturated compounds by:

(a) admixing with the composition at least about 0.1 weight percent, based upon the weight of the composition, of an electron-rich, aromatic promoter; and (b) exposing the admixture of (a) to a sufficient amount of radiant energy to essentially completely polymerize the ethylenically unsaturated components of the composition.

For example, a composition consisting of the diacrylate of a bisphenol A and epichlorohydrin condensation adduct in a dicyclopentadiene acrylate diluent is vinyl polymerized in the presence of 1,4-dimethoxybenzene with electromagnetic radiation such that less than 0.2 percent unreacted dicyclopentadiene acrylate monomer is present in the resulting cured composition.

20 Claims, No Drawings

ELECTRON RICH AROMATICS AS CURE PROMOTERS FOR RADIATION CURABLE COMPOSITIONS

CROSS-REFERENCE TO RELATED APPLICATION

This application is a continuation of application Ser. No. 240,706 filed Mar. 5, 1981, now abandoned.

BACKGROUND OF THE INVENTION

1. Field of the Invention

This invention relates to the free radical addition polymerization of photocurable compositions which contain ethylenically unsaturated compounds. In one aspect, the invention relates to a class of additives useful in such a polymerization and in another aspect the invention relates to the use of these additives to promote essentially complete vinyl polymerization of the composition.

2. Description of the Prior Art

Photocurable compositions are useful in ink and coating formulations. Incomplete cure of photocurable compositions is a problem long recognized in the art. Although this problem is manifest in many photocurable compositions, the problem of incomplete cure with multifunctional acrylate materials is particularly troublesome. Multifunctional acrylate diluents, such as 1,6-hexanediol diacrylate, trimethylol propane triacrylate or pentaerythritol triacrylate, are well-known to produce significant residual unsaturation in photocurable compositions. A similar but lesser known problem can also arise with sterically encumbered monofunctional acrylates such as dicyclopentadiene acrylate (DCPDA). Residual acrylate in cured coatings has several deleterious effects among which are objectionable odors and loss of film properties over time (films may become yellow and brittle). This odor problem is particularly noticeable in the case of DCPDA.

Although numerous approaches are known for essentially completing the cure of such photocurable compositions, many are not effective with sterically encumbered monofunctional acrylates while others have undesirable limitations and/or features. For example, the use of various photoinitiators, comonomers, and drier metals, such as cobalt naphthenate, do not reduce the level of residual DCPDA below 5 or 6 weight percent of the cured compositions. Other means, such as post-bake treatment, have limited utility. Post-baked treatment is generally limited to heat insensitive objects and requires an extra, energy-consuming process step.

U.S. Pat. No. 4,077,858 teaches the use of an aliphatic saturated ether as a promoter for essentially complete polymerization of residual unsaturation in multifunctional acrylate photocurable compositions. However, the method taught therein is somewhat inefficient due to the significant amount of promoter it requires.

U.S. Pat. No. 4,209,371 teaches the use of polyesters of molecular weights not in excess of 1,000 as promoters for essentially complete vinyl polymerization of residual unsaturation in sterically encumbered monofunctional acrylates used in photocurable compositions. However, the method taught does not reduce the level of residual DCPDA to a level which is desirable for some applications.

In view of the aforementioned deficiencies of conventional photocurable compositions, it is highly desirable to provide a photocurable composition that can be more completely cured to a polymeric state having essentially no odor of monomer and having improved physical properties which do not change with time after curing is completed.

SUMMARY OF THE INVENTION

In one aspect, the present invention is such a photocurable composition comprising an ethylenically unsaturated resin, at least one monovinylidene diluent, a photoinitiator and an electron-rich, aromatic promoter. The proportions of the components of the composition are such that, upon exposure to the appropriate light radiation, the composition cures to form a hard tack-free coating or film which contains less than 1 weight percent of a monovinylidene diluent.

In another aspect, this invention is a method of curing the aforementioned composition which method comprises exposing the curable composition to sufficient light to cure the composition.

Surprisingly, the practice of this invention reduces the residual amount of unreacted monovinylidene diluent to levels which do not produce an odor detectable by humans. Preferably, the residual amount of diluent, such as DCPDA, is reduced to less than about 1 weight percent, and most preferably less than about 0.02 weight percent, of the cured composition. The practice of this invention is also surprising in that (1) in certain formulations it provides excellent adhesion, and (2) it avoids the yellowing problem which occurs when amine promoters are used.

DETAILED DESCRIPTION OF THE INVENTION

Electron-rich, aromatic promoters are aromatic carbocyclic compounds which bear electron-donating substituents. Examples of these substituents include —OH, —OR, —NHCOR, —R, —NR$_2$ and aryl, wherein R is alkyl; cf. J. D. Roberts & M. C. Caserio, *Basic Principles of Organic Chemistry*, 800–802 (1964). Preferred electron-rich, aromatic promoters are (1) aromatic compounds having at least three fused benzene rings and having ionization potentials less than 7.5 eV, as determined by electronic spectroscopy, and (2) alkyl ether derivatives of benzene or naphthalene.

The electron-rich, aromatic promoters should not bear groups or substituents such as ester or carbonyl which interfere with the photocuring mechanism. Electron-rich, aromatic promoters act in such a manner as to improve the degree of cure and, in certain instances, the physical properties of the photocurable compositions into which they are mixed. The most preferred electron-rich, aromatic promoters are 9,10-dimethoxy-2-ethylanthracene, 9-butylanthracene and 1,4-dimethoxybenzene.

The electron-rich, aromatic promoters are employed in an amount sufficient to reduce the concentration of unreacted diluent to a level below 1 weight percent of the curable composition. Practical considerations, such as coating cure response and cost, restrict the amount of electron-rich, aromatic promoter that can be used. Preferably the promoter is employed in amounts of at least about 0.1 weight percent based on the curable composition, most preferably from about 2 to about 3 percent.

The photocurable compositions of this invention contain a polyethylenically unsaturated polymerizable resin compound containing at least two ethylenically unsaturated polymerizable groups per molecule in an amount sufficient to provide a polymer having the desired physical properties upon photocuring of said composition. Typically, said compositions contain from about 25 to about 98 weight percent, based upon the total curable composition, of the aforementioned polyethylenically unsaturated compound. A wide variety of such materials can be used and several are detailed at length in U.S. Pat. No. 4,077,858, which is incorporated herein by reference.

In order to use the high molecular weight varieties of the aforementioned resin components, the compositions usually contain sufficient diluent to provide viscosities that are suitable for coating applications. Thus, the resin is often diluted with a low molecular weight, low viscosity, monovinylidene diluent. For the purposes of this invention, monovinylidene unsaturated diluents are diluents containing a single polymerizable ethylenically unsaturated group of the formula

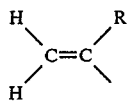

wherein R is H, CH$_3$, halo, or any group which does not interfere with the photocuring mechanism. Almost any monovinylidene monomer may be employed as a diluent provided it is copolymerizable with the polyethylenically unsaturated compound described in the previous paragraph. For example, styrene, α-methylstyrene, and other copolymerizable monomers are useful as diluents. Several of these monomers are disclosed in U.S. Pat. No. 4,077,858.

This invention is particularly useful for promoting essentially complete polymerization of curable compositions containing dicyclopentadiene acrylate (DCPDA) as a diluent. DCPDA is an example of a sterically-encumbered monofunctional acrylate diluent. "Sterically-encumbered" means that the acrylate functionality is pendant from either a ring structure (either aromatic or nonaromatic) or from a highly branched aliphatic radical.

Viscosity considerations are the principal limitation upon the relative concentrations of diluent and polyethylenically unsaturated resin compound employed in the photocurable compositions of this invention. The photocurable compositions of this invention contain an amount of diluent sufficient to give them suitable application viscosities, e.g., viscosities which allow the compositions to be evenly coated onto suitable substrates. Typically, the curable composition contains from about 5 to about 55 weight percent concentration of the diluent.

The preferred manner of practicing this invention employs, in addition to the previously mentioned electron-rich, aromatic promoters, a photoinitiator. The photoinitiator is useful for sensitizing the photocurable compositions to UV light. The art is replete with various types of suitable photoinitiators and those disclosed in U.S. Pat. No. 4,077,858 are exemplary. Derivatives of acetophenone are the preferred photoinitiators and these are amply described in U.S. Pat. No. 3,715,293. The photoinitiators are used in the known prior art manner and concentrations, e.g., as described in U.S. Pat. No. 4,077,858.

Typically, a mixture of the photocurable composition of the instant invention is prepared and applied to a substrate. The compositions of the instant invention can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

The composition is preferably cured by exposing it to electromagnetic radiation having wavelengths above about 2000 Angstrom units up to about 6000 Angstrom units. In the most preferred case, the wavelength of the exciting electromagnetic radiation should overlap with the absorption maxima of the photoinitiator. For the examples cited herein, lamps having emission in the region of 3200 to 3600 Angstrom units are most preferred. The radiation source is located near the coating for a time sufficient to cause cross-linking of the composition. Preferably, the exposure time will range from about 0.1 seconds up to about 1 minute/linear foot. The radiation source is preferably placed about 1 to 5 inches from the coating. The light radiation will generally have a power of about 200 watts per linear foot, and can be generated from any one of a number of different pressure mercury lamps.

The following are illustrative embodiments of this invention and comparative experiments. Unless indicated to the contrary, all parts and percentages are by weight.

EXAMPLES AND COMPARATIVE EXPERIMENTS

Degree of Cure

In Comparative Experiments 1–9, a photocurable formulation is prepared using DCPDA, a styrenated polyester, and various photoinitiators. In Examples 1–3, similar formulations are prepared using a single photoinitiator and, additionally, an electron-rich, aromatic promoter. Each photoinitiator is evaluated in formulations containing 5, 10, and 20 percent DCPDA, labeled Composition A, B and C, respectively, for each photoinitiator formulation. This mixture is spread with a wound wire rod onto steel test panels, which have been treated with zinc phosphate. This coating mixture is then cured by passing it under a 200 watt per linear inch mercury vapor lamp on a conveyor moving at 50 feet per minute. The cured coating is then extracted with methylene chloride and an external analytical standard solution is added to the extract. The composition of the extract is then determined by gas chromatography. Data from these experiments showing residual levels of styrene and DCPDA after 2, 4 and 6 passes under the lamp appear in Tables I and II.

In Comparative Experiment 1, a composition is prepared with 1.1 g of methyl diethanolamine, 1.6 g of diethoxyacetophenone, 2.5 g of DCPDA, and 50 g of Polylite ® 31-039, consisting of 27.5 g of a reactive alkyd resin dissolved in 22.5 g of styrene. Polylite ® is a trademark of Reichhold Chemicals, Inc. After four passes under the mercury vapor lamp, extraction of the coating shows 0.83 weight percent of unreacted DCPDA monomer is present in the coating. After six passes, 0.026 weight percent of unreacted DCPDA monomer is found.

TABLE I

Cure Response of Photopolymerizable
Compositions - Comparative Experiments
which are not Examples of this Invention

| Experiment | Composition | % DCPDA | After 2 Passes Wt % Styrene | After 2 Passes Wt % DCPDA | After 4 Passes Wt % Styrene | After 4 Passes Wt % DCPDA | After 6 Passes Wt % Styrene | After 6 Passes Wt % DCPDA |
|---|---|---|---|---|---|---|---|---|
| 1 | A1 | 5 | 1.6 | 1.7 | 0.14 | 0.83 | 0.09 | 0.026 |
| 2 | B1 | 10 | 0.07 | 4.5 | 0.30 | 2.10 | 0 | 0.430 |
| 3 | C1 | 20 | 0 | 5.2 | 0.30 | 2.70 | 0 | 0.970 |
| 4 | A2 | 5 | 1.3 | 2.6 | 0.15 | 1.1 | 0.11 | 0.78 |
| 5 | B2 | 10 | 0.32 | 2.5 | 0.09 | 1.7 | 0 | 0.89 |
| 6 | C2 | 20 | 0.17 | 3.7 | 0.03 | 2.4 | 0 | 1.6 |
| 7 | A3 | 5 | 1.2 | 1.2 | 0.37 | 1.2 | 0.23 | 0.87 |
| 8 | B3 | 10 | 0.14 | 2.0 | 0.05 | 1.7 | 0 | 0.89 |
| 9 | C3 | 20 | 0.35 | 4.0 | 0.04 | 2.3 | 0 | 0.21 |

Composition A1 = 50 g Polylite ® 31-039 + 2.5 g DCPDA + 1.6 g DEAP[1] + 1.1 g MDEA[2]
Composition B1 = 50 g Polylite ® 31-039 + 5.0 g DCPDA + 1.7 g DEAP[1] + 1.1 g MDEA[2]
Composition C1 = 50 g Polylite ® 31-039 + 10 g DCPDA + 1.8 g DEAP[1] + 1.2 g MDEA[2]
Composition A2 = 50 g Polylite ® 31-039 + 2.5 g DCPDA + 1.6 g MPDE[3]
Composition B2 = 50 g Polylite ® 31-039 + 5.0 g DCPDA + 1.7 g MPDE[3]
Composition C2 = 50 g Polylite ® 31-039 + 10 g DCPDA + 1.8 g MPDE[3]
Composition A3 = 50 g Polylite ® 31-039 + 2.5 g DCPDA + 1.6 g DMDE[4]
Composition B3 = 50 g Polylite ® 31-039 + 5.0 g DCPDA + 1.7 g DMDE[4]
Composition C3 = 50 g Polylite ® 31-039 + 10 g DCPDA + 1.8 g DMDE[4]

[1]Diethoxyacetophenone (photoinitiator).
[2]Methyl Diethanolamine (conventional promoter).
[3]2-(2-Methylpropoxy)-1,2-diphenylethanone (photoinitiator).
[4]2,2-Dimethoxy-1,2-diphenylethanone (photoinitiator).

Examples 1 through 3 demonstrate that an electron-rich, aromatic promoter, 1,4-dimethoxybenzene in each case, can promote essentially complete polymerization of the photocurable composition. In each instance, the use of the electron-rich, aromatic promoter produces a cured composition which is essentially free of residual DCPDA diluent as well as styrene. Experimental data for experiments 1 through 3 appear in Table II, which follows.

TABLE II

Examples of Cure Response of
Photopolymerizable Compositions
Containing DCPDA and an Electron-
Rich, Aromatic Promoter

| Example | Composition | % DCPDA | After 2 Passes Wt % Styrene | After 2 Passes Wt % DCPDA | After 4 Passes Wt % Styrene | After 4 Passes Wt % DCPDA | After 6 Passes Wt % Styrene | After 6 Passes Wt % DCPDA |
|---|---|---|---|---|---|---|---|---|
| 1 | A | 5 | 0.44 | 2.9 | 0.25 | 0.48 | 0 | 0 |
| 2 | B | 10 | 1.2 | 5.2 | 0.12 | 0.83 | 0 | 0 |
| 3 | C | 20 | 0.06 | 4.4 | 0.05 | 1.1 | 0 | 0 |

Composition A = 50 g Polylite ® 31-039 + 2.5 g DCPDA + 1.6 g DEAP[1] + 1.1 g DMB[2]
Composition B = 50 g Polylite ® 31-039 + 5.0 g DCPDA + 1.7 g DEAP[1] + 1.1 g DMB[2]
Composition C = 50 g Polylite ® 31-039 + 10 g DCPDA + 1.8 g DEAP[1] + 1.2 g DMB[2]

[1]Diethoxyacetophenone (photoinitiator).
[2]p-Dimethoxybenzene (electron-rich aromatic promoter).

Improved Adhesion

The following comparative experiment illustrates the use of an appropriate photoinitiator without any promoter. Poor adhesion is observed.

COMPARATIVE EXPERIMENT 10

A 1:1 mixture by weight of DCPDA and diacrylate of diglycidyl ether of bisphenol A (1.955 g) was mixed with p-tertbutyl-α,α,α-trichloroacetophenone (0.0525 g) and coated onto an aluminum panel. After 6 passes under a 200 watt per linear inch UV lamp at a conveyor speed of 100 feet per minute, the coating became tack-free. The cured coating gave 0 percent adhesion (crosshatch test) both immediately and 24 hours after cure.

The following example illustrates the use of an electron-rich, aromatic promoter, combined with an appropriate photoinitiator, to give enhanced adhesion of a photocurable coating to a metal substrate.

EXAMPLE 4

To the same formulation used in Comparative Experiment 10 is added 9,10-dimethoxy-2-ethylanthracene (electron-rich aromatic promoter) (0.0058 g). The formulation is then coated onto an aluminum panel. The coated panel is cured to a tack-free state after 3 to 4 passes under a 200 watt per linear inch lamp and is found to give 0 percent adhesion immediately after cure, but 100 percent adhesion 24 hours after cure.

Although this invention is described in considerable detail by way of the above examples, this detail is for the purpose of illustration only and is not intended to be a limitation on the scope of this invention or the appended claims.

What is claimed is:

1. A photopolymerizable composition comprising the following components:
   (a) an ethylenically polymerizable compound containing at least two ethylenically unsaturated polymerizable groups per molecule;
   (b) at least one monovinylidene diluent;
   (c) a photoinitiator; and
   (d) an electron-rich, aromatic promoter,
   said components being present in proportions such that, upon exposure to the appropriate light radiation, the composition cures to form a hard tack-free coating or film which contains less than 1 weight percent of a monovinylidene diluent.

2. A photopolymerizable composition in accordance with claim 1 wherein the diluent is a sterically encumbered monofunctional acrylate and wherein the electron-rich aromatic promoter is employed in an amount which is at least about 0.1 weight percent of the weight of the total composition and is selected from:
   (1) an alkyl ether derivative of benzene or naphthalene;
   (2) an aromatic polycyclic compound having at least three fused benzene rings and an ionization potential of less than 7.5 eV; or
   (3) a mixture of (1) and (2).

3. A photopolymerizable composition in accordance with claim 2 wherein the diluent is dicyclopentadiene acrylate.

4. A photopolymerizable composition in accordance with claim 2 wherein the photoinitiator is selected from diethoxyacetophenone and p-tertbutyl-α,α,α-trichloroacetophenone.

5. A photopolymerizable composition in accordance with claim 3 wherein the electron-rich, aromatic promoter is 9-butylanthracene or 9,10-dimethoxy-2-ethylanthracene or a mixture thereof.

6. A photopolymerizable composition in accordance with claim 3 wherein the electron-rich, aromatic promoter is 1,4-dimethoxybenzene.

7. A photopolymerizable composition in accordance with claim 6 which, after exposure to a sufficient amount of radiation, contains less than 0.02 weight percent of residual unreacted diluent.

8. A method of curing photocurable compositions containing a polyethylenically unsaturated resin and an ethylenically unsaturated diluent, comprising:
   (a) mixing with the composition at least about 0.1 weight percent, based upon the weight of the composition, of an electron-rich, aromatic promoter which is
   (1) an alkyl ether derivative of benzene or naphthalene, or
   (2) an aromatic polycyclic compound having at least three fused benzene rings and an ionization potential of less than 7.5 eV, or
   (3) a mixture of (1) and (2); and
   (b) exposing the resulting mixture to electromagnetic radiation having wavelengths above about 2000 Angstrom units in an amount sufficient to cure the mixture to form a composition that is essentially free of polymerizable ethylenically unsaturated compounds.

9. The method as described in claim 8 wherein the electron-rich, aromatic promoter is present in a concentration of at least about 1 weight percent.

10. The method of claim 8 wherein at least one monovinylidene diluent is a sterically encumbered monofunctional acrylate.

11. The method of claim 8 wherein the amount of residual, unreacted monovinylidene diluent is reduced to less than 1 weight percent of the cured composition.

12. The method of claim 8 wherein the resulting cured composition is very resistant to yellowing.

13. The method of claim 10 wherein at least one sterically encumbered monofunctional acrylate diluent is dicyclopentadiene acrylate.

14. The method of claim 10 wherein the amount of residual, unreacted dicyclopentadiene acrylate is undetectable to the human olfactory senses.

15. The method of claim 13 wherein the electron-rich, aromatic promoter is 9,10-dimethoxy-2-ethylanthracene or 9-butylanthracene.

16. The method of claim 13 wherein the electron-rich, aromatic promoter is 1,4-dimethoxybenzene.

17. The method of claim 16 wherein the amount of residual, unreacted sterically encumbered monofunctional acrylate is reduced to less than 0.02 weight percent of the cured composition.

18. A photopolymerizable composition comprising the following components:
   (a) an ethylenically polymerizable compound containing at least two ethylenically unsaturated polymerizable groups per molecule;
   (b) a sterically encumbered monofunctional acrylate diluent;
   (c) a photoinitiator; and
   (d) 1,4-dimethoxybenzene; said components being present in proportions such that, upon exposure to the appropriate light radiation, the composition cures to form a hard tack-free coating or film which contains less than 1 weight percent of the acrylate diluent.

19. A composition according to claim 18 wherein the 1,4-dimethoxybenzene is at least about 0.1 weight percent of the composition.

20. A composition according to claim 19 wherein the 1,4-dimethoxybenzene is employed in an amount which is from about 2 to about 3 weight percent based on the curable composition.

* * * * *